US011067712B2

(12) United States Patent
Van Veldhuizen et al.

(10) Patent No.: US 11,067,712 B2
(45) Date of Patent: Jul. 20, 2021

(54) PROTECTIVE STRUCTURE FOR A SEISMIC SOURCE ARRAY

(71) Applicant: Fugro N.V., Leidschendam (NL)

(72) Inventors: Sebastiaan Cornelis Antonius Van Veldhuizen, Leidschendam (NL); Blair Hamilton McGunnigle, Leidschendam (NL); Marco Scholtens, Leidschendam (NL)

(73) Assignee: FUGRO N.V.

( * ) Notice: Subject to any disclaimer, the term of this patent is extended or adjusted under 35 U.S.C. 154(b) by 493 days.

(21) Appl. No.: 16/082,504

(22) PCT Filed: Mar. 7, 2017

(86) PCT No.: PCT/NL2017/050136
§ 371 (c)(1),
(2) Date: Sep. 5, 2018

(87) PCT Pub. No.: WO2017/155391
PCT Pub. Date: Sep. 14, 2017

(65) Prior Publication Data
US 2019/0079207 A1 Mar. 14, 2019

(30) Foreign Application Priority Data
Mar. 8, 2016 (NL) .................................. 2016387

(51) Int. Cl.
*G01V 1/00* (2006.01)
*G01V 1/18* (2006.01)
*G01V 1/38* (2006.01)
(52) U.S. Cl.
CPC ............ *G01V 1/3808* (2013.01); *G01V 1/006* (2013.01); *G01V 1/186* (2013.01); *G01V 1/38* (2013.01);
(Continued)

(58) Field of Classification Search
CPC ...... G01V 1/3808; G01V 1/38; G01V 1/3843; G01V 1/006; G01V 1/186; G01V 2210/1297
See application file for complete search history.

(56) References Cited

U.S. PATENT DOCUMENTS 4,719,987 A 1/1988 George, Jr. et al.
4,721,180 A 1/1988 Haughland et al.
(Continued)

FOREIGN PATENT DOCUMENTS

AU 2017231572 A1 * 9/2018 ........... G01V 1/3843
CA 2920219 A1 2/2015
(Continued)

OTHER PUBLICATIONS

International Search Report and Written Opinion; PCT Application No. PCT/NL2017/050136; dated May 15, 2017.
(Continued)

*Primary Examiner* — Daniel Pihulic
(74) *Attorney, Agent, or Firm* — Polsinelli PC

(57) ABSTRACT

The present invention relates to a seismic source array for deploying a seismic source array, comprising a housing and a plurality of seismic sources suspending from the housing, each source being configured for generating a pressure pulse signal, wherein the array further comprises a protective structure attached to the housing and defining a protective space near the housing, wherein the seismic sources in a first position relative to the housing suspend from the housing such as to be arranged in the protective space defined by the protective structure, and wherein at least one of the seismic sources suspends from the housing by means of a suspension structure configured for moving the at least one seismic source to a second position relative to the housing, the second position being located outside the protective space.

12 Claims, 3 Drawing Sheets

(52) U.S. Cl.
CPC .... *G01V 1/3843* (2013.01); *G01V 2210/1297* (2013.01)

(56) References Cited

U.S. PATENT DOCUMENTS

| | | | | |
|---|---|---|---|---|
| 4,970,700 | A * | 11/1990 | Gilmour | G01S 15/8902 367/88 |
| 5,616,059 | A | 4/1997 | Solomon | |
| 2004/0000446 | A1 | 1/2004 | Barber, Sr. | |
| 2008/0068926 | A1 * | 3/2008 | Chambers | G01S 15/96 367/7 |
| 2019/0079207 | A1 * | 3/2019 | Van Veldhuizen | G01V 1/006 |

FOREIGN PATENT DOCUMENTS

| | | | | |
|---|---|---|---|---|
| DK | 3427086 T3 * | 3/2020 | | G01V 1/38 |
| EP | 3427086 B1 * | 1/2020 | | G01V 1/3843 |
| GB | 2152216 A | 7/1985 | | |
| NL | 2016387 B1 * | 9/2017 | | G01V 1/38 |
| WO | 2017155391 A1 | 9/2017 | | |
| WO | WO-2017155391 A1 * | 9/2017 | | G01V 1/006 |

OTHER PUBLICATIONS

Seascan: "Tri-Cluster Floatation System", Jan. 1, 2012; XP055313426; Retrieved on Oct. 24, 2016 from the Internet: URL:http://www.seascanseismic.com/Tri-Cluster.htm.

* cited by examiner

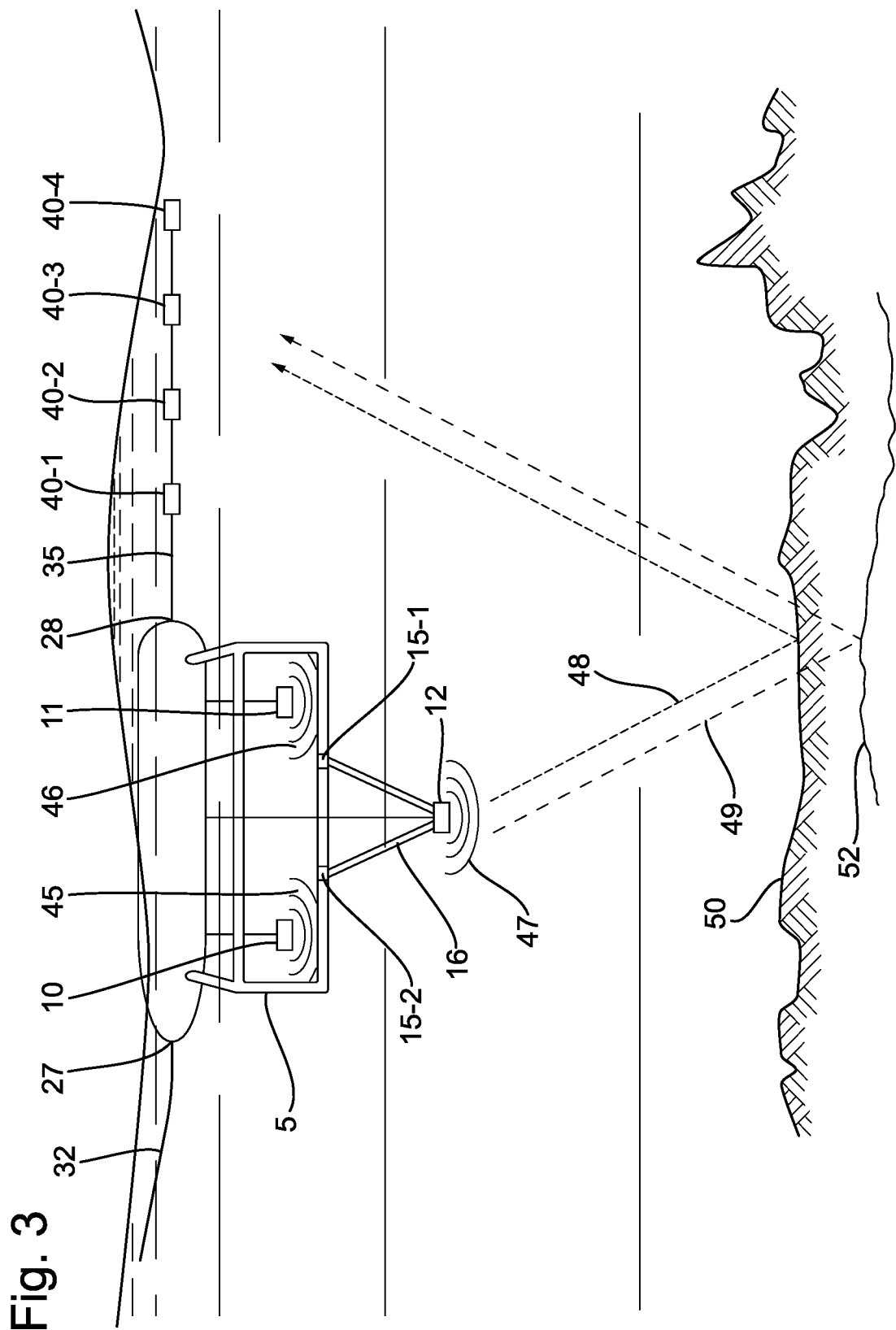

PROTECTIVE STRUCTURE FOR A SEISMIC SOURCE ARRAY

CROSS-REFERENCE TO RELATED APPLICATIONS

This application is a national stage application of International Application No. PCT/NL2017/050136, which was filed on Mar. 7, 2017, which claims priority to Netherlands Application Number 2016387 filed on Mar. 8, 2016, of which is incorporated by reference in its entirety.

FIELD OF THE INVENTION

The present invention is directed at a seismic source array for deploying a seismic source array, comprising a housing and a plurality of seismic sources suspending from the housing, each source being configured for generating a pressure pulse signal. The invention is further directed at a survey ship configured for deploying a seismic source array.

BACKGROUND

Seismic source arrays or otherwise called gun arrays are generally used for exploration of subsurface earth structures. For example, such information may be used to identify earth formations or layers having typical properties that make likely to be oil and gas production fields. A seismic source array may comprise for example a floatation element and including a housing and a plurality of seismic source elements. Seismic source elements are available in various types. For marine exploration purposes, use may for example be made of air guns using compressed air to generate an acoustic pressure pulse underwater. Alternatively, plasma sources or other signal sources may be applied to generate acoustic pulses for seabed survey and subsurface earth exploration in the water.

The seismic sources send an signal towards the sea floor. The signal is partly reflected by each subsurface layer, and the reflected waves can be received again using receivers. As may be appreciated, the properties of the reflected signal depend on the properties of the subterranean structure that causes the deflection. Therefore, the received signal provides information on properties, such as shape, hardness, thickness or porosity of the layer. This allows identification of the type of layer and whether or not it may potentially contain valuable minerals, such as oil, gas, salts, valuable metals or other the like.

Launching and recovery of seismic source arrays from ships may be difficult under harsh circumstances, such as bad weather and high waves at sea. The seismic source array may be towed by the ship, enabling for example the hauling thereof back on board. However, the seismic sources typically suspend from the housing of the array such as to be submerged in the water underneath the array. During launch and recovery, significant manual handling is required. Recovering the array back on board under rough conditions may risk the seismic sources to hit the hull of the exploration ship that has towed the array. Moreover, because the seismic sources suspend from the housing at typical distances of a couple of meters underneath the housing, the dangling source elements form a danger to the operators on deck during recovery and launch.

SUMMARY OF THE INVENTION

It is an object of the present invention to provide a seismic source array that may be safely deployed under rough conditions in the water.

To this end, there is provided herewith a seismic source array, comprising a housing and a plurality of seismic sources suspending from the housing, each source being configured for generating a seismic signal, wherein the array further comprises a protective structure attached to the housing and defining a protective space near the housing, wherein the seismic sources, in a first position relative to the housing, suspend from the housing such as to be arranged within the protective space defined by the protective structure, and wherein at least one of the seismic sources suspends from the housing by means of a suspension structure configured for moving the at least one seismic source to a second position relative to the housing, the second position being located outside the protective space.

The seismic source array of the present invention comprises a protective structure attached to the housing that defines a protected space within the protective structure elements. At least one of the seismic sources is suspended from the housing such as to be located within the protected space defined by the protective structure. Therefore, upon launch and recovery of the array, the seismic sources cannot freely move around but are restrained by the protective structure. The seismic source array may be lifted from the water and placed onto the deck, while the seismic sources suspend therefrom underneath the housing between the structural elements. Moreover, the protective structure may, in accordance with some embodiments, advantageously be formed such as to support the seismic source array while placed on deck of a survey ship or other carrier.

Moreover, advantageously, at least one of the seismic sources may be lowered or moved out of the protective space defined by the structure. This, in use, provides the advantage that this at least one seismic source may be lowered to a slightly different depth in use to enable identification and filtering of ghost reflections in the received acoustic signal. Ghost reflections are reflections of the acoustic signal that are reflected at the water surface instead of at or below the sea bed. At launch or upon recovery, this at least one seismic source may be moved back into the protective space such as to be protected (and not form a danger) during handling of the array on board.

Advantageously, in accordance with some embodiments, the protective structure comprises a frame defining the protective space on at least two sides thereof. A frame or other open structure advantageously defines the protective space, while at the same time forming an open structure that does not make the seismic source array prone to shear forces caused by sideways flow of water in relation to the tow direction.

In accordance with some other embodiments, the suspension structure of the at least one seismic source comprises a pivotable arm structure arranged for pivoting relative to the frame for bringing the at least one seismic source to the second position. The pivotable arm may be connected with a hingeable connection to the frame. The pivotable arm may consist of a single arm moveable relative to the protective structure for bringing the seismic source from the first position to the second position. In accordance with some embodiments, for providing additional stability, the pivotable arm may consist of two arms forming a V-shape and connecting to the seismic source at the apex of the V while being hingeable at the ends of the legs of the V. Another alternative of this type of arm is a wishbone shape or Y-shape, providing additional stability as well.

In accordance with some embodiments, the seismic source array further comprises a hoist line extending through the housing, the hoist line being extendable and retractable for enabling the at least one seismic source to be moveable between the first position and the second position. The hoist line allows to move the seismic source from the first to the second position from the housing. For example, in accordance with some embodiments, the hoist line connects to a reel arranged inside the housing, the reel being operable for enabling said extending and retracting of the hoist line in use. The reel may be coupled to an actuator operable to extend or retract the hoist line, for example operated by means of a controller in the housing or from an exploration ship or carrier towing the array.

In accordance with some particular embodiments thereof, the seismic source array comprises three seismic sources, wherein two of said seismic sources suspend from the housing such as to use in remain in the first position relative to the housing, and wherein a third of said seismic sources suspends from the housing by means of said suspension structure configured for moving the third seismic source to the second position relative to the housing, the third seismic source being connected to the protective structure by means of the pivotable arm, wherein the hoist line extends from the housing such as to enable operation of the pivotable arm during launch and recovery of the array.

Yet, in accordance with some of these embodiments, a first section of the hoist line extends through a first part of the housing towards the at least one seismic source, and a second section of the hoist line extends through a second part of the housing opposite the first part, the hoist line comprising a coupling element on said second section thereof for enabling coupling thereof to an external recovery part. Thereby, the hoist line may serve as a means for bringing the array on board of an exploration ship or carrier by lift it from the water with an on board crane, A-frame or Π-frame. The hoist line may be connected to a lift line or cable to lift it from the water. Thereby, by pulling the hoist line as a result of lifting, the other end of the hoist line that is connected to the arm will be pulled upward to move the seismic source back to the first position in the protective space. Hence, the hoist wire for the lower seismic source may be the same wire used for hoisting and recovering the vessel from the water.

In accordance with some embodiments, the housing of the seismic source array further comprises at least one element of a group comprising: one or more floatation elements such as buoys, integrated or as separate elements, a positioning device such as a global positioning system (GPS) device, a gas manifold including gas channels coupled to the plurality of seismic sources (the seismic sources may for example be air guns other gas guns), a wireless or wireline communication device such as a transceiver for exchanging data signals with a further vessel, and/or a tow connector part for enabling a tow line to extend from the housing for towing of the array. The seismic source array in accordance with some embodiments, may further comprise a receiver line extending from the housing towards one or more acoustic receiver units for receiving an acoustic signal.

The invention is not limited to any particular type of seismic sources. The seismic sources are configured for generating a seismic signal, such as a pressure pulse signal or acoustic signal, an electromagnetic signal, etc.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 3 schematically illustrates a seismic source array of the present invention in operation.

DETAILED DESCRIPTION

Figure 1:
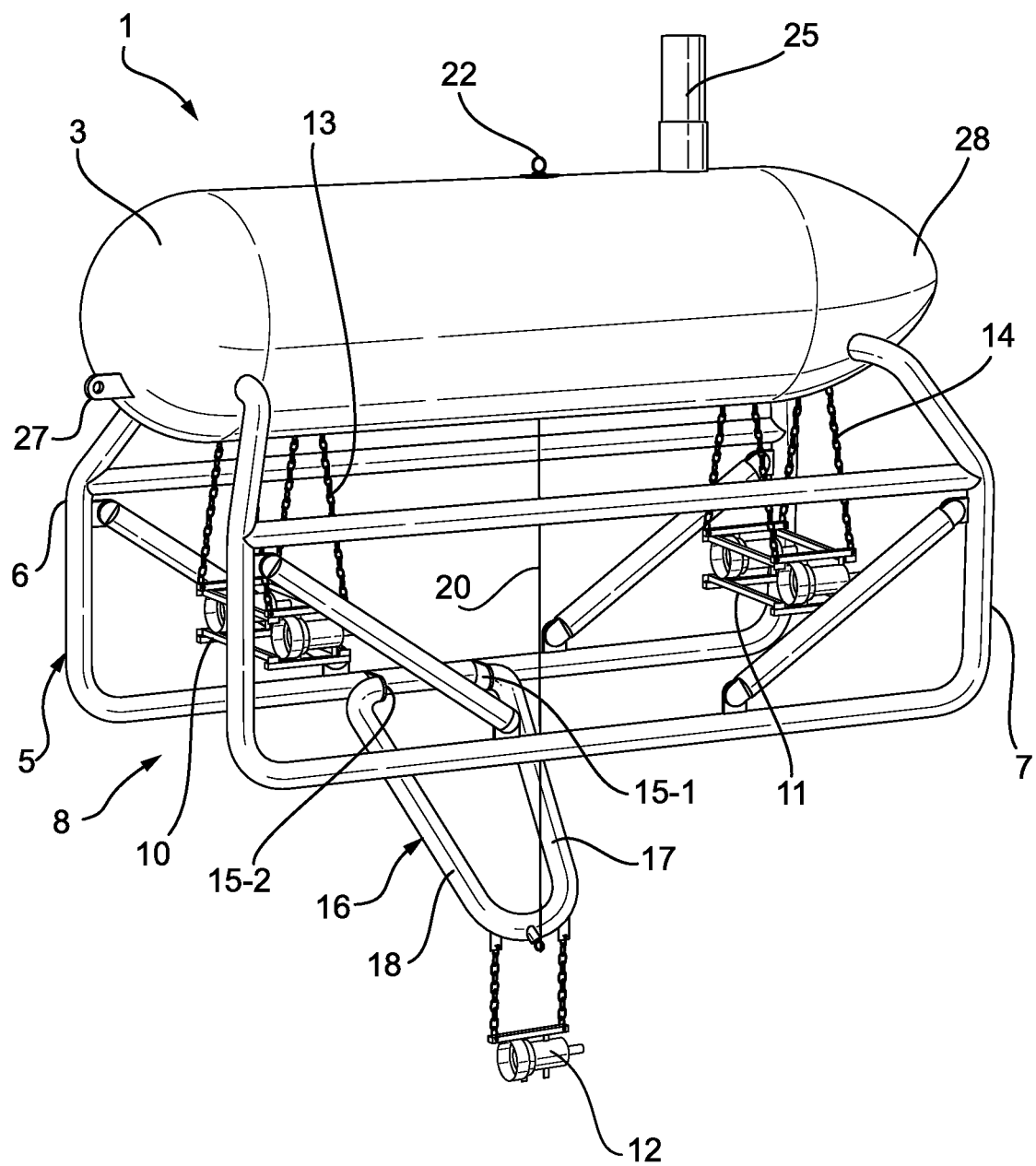
FIG. 1 illustrates a seismic source array in accordance with an embodiment of the invention.

FIG. 1 schematically illustrates a seismic source array in accordance with the present invention. In FIG. 1, the seismic source array 1 is illustrated, comprising a hull or housing 3. The hull may protect all kinds of instruments and other features of the array 1, for example a positioning device such as a global positioning system (GPS) device, a wireless or wireline communication device, a controller arranged for receiving instructions via the communication device and for controlling operation of the array and its instruments responsive to such instructions, a possibly a plurality of other types of instruments. The communication unit may for example provide a data connection with a tow vessel, such as a survey ship or exploration carrier. It may further comprise one or more signal connections with acoustic receivers (e.g. receiver elements 40-1 to 40-4 shown in FIG. 3) that may be towed behind the seismic source array 1. The array may further optionally comprise signal (pre)processing electronics such as filter units or amplifiers, and an on-board analysis unit for receiving preprocessed output signals from acoustic receivers and for analysis thereof such as to provide a data signal back to the survey ship. Less complex systems may for example only comprise some basic electronics to receive the output signals from the receivers and pass them on to the survey ship, either with or without signal information of the acoustic signals provided by the seismic source elements 10, 11 and 12 to be discussed below. The hull 3 may comprise one or more floatation elements inside (not shown) or may serve as a floatation element.

Underneath the array 1, a plurality of seismic source elements 10, 11 and 12 suspend from the hull 3. The suspension may be by means of cable or chain connections 13 and 14 to the hull 3. The seismic source element 12 connects via a pivotable arm 16 to a frame 5. The frame 5 is fixed to the hull 3. The seismic source 10, 11 and 12, in the embodiment illustrated in FIG. 1 are air guns operated by air pressure provided via the gas manifold inside the hull 3 and via gas channels. The gas manifold (not shown) may be operated by the controller (not shown) to apply pressurized air to the air guns such as to generate a synchronized acoustic pressure pulse from the seismic sources 10, 11 and 12. The invention is not limited to these types of seismic source elements. Other types of sources, e.g. plasma sources or electromagnetic vibrators or sources are known in the field and are considered to be comprised within the scope of the present invention.

The array 1 is towed via a tow line (e.g. element 32, FIG. 3) connectable to the tow connection 27 on the hull 3. The tow line 32 is also used for hauling the array 1 back to the survey ship to recover the array. On the opposing end 28 of the hull 3, a receiver line 35 illustrated in FIG. 3 may extend towards a plurality of receivers 40-1, 40-2, 40-3 and 40-4 (note that the number of receivers is merely an example, and any number of receivers 40 may be connected via the receiver line 35. Furthermore, with reference again to FIG. 1, a global positioning system (GPS) antenna 25 may be connected to a GPS system (not shown) to provide positioning data to the controller of the array 1, that is used for mapping the data geographically.

The frame 5 connected to the hull 3 comprises a first frame structure element 6 and a second frame structure element 7. The frame structure elements 6 and 7, located on either side of the hull 3, define a protective space 8 located directly underneath the housing or hull 3. In FIG. 1, the seismic sources 10 and 11 suspend from the hull 3 such as to be located within the protective space 8. The third seismic source 12 suspends from the pivotable arm 16, and is in the operational situation illustrated in FIG. 1 located outside the protective space 8 (i.e. in the second position relative to the housing 3). The depth of the seismic source elements 10, 11 and 12 may be carefully chosen relative to each other and relative to the water surface. For example, the depth of the seismic source elements 10 and 11 may be such that upward travelling acoustic pressure wavefields cause an elastic behavior at the sea surface. The third seismic source element 12, in its second position illustrated in FIG. 1, may be at a depth in relation to the other seismic source elements 10 and 11, such that their respective downwardly-travelling primary pressure wavefields constructively interfere. Together, this causes provides an optimal signal-to-noise ratio with respect to the ghost signals produced by the upward travelling acoustic pressure waves.

The third seismic source 12 can be brought in at the desired optimal depth relative to the other seismic sources 10 and 11 by means of the pivotable arm 16. In the illustration of FIG. 1, the pivotable arm 16 consists of arm elements 17 and 18 that together form a V-shaped arm 16. At the ends of the V-shape 16, pivots 15-1 and 15-2 connect the arm 16 to frame element 6. The V-shape provides additional mechanical stability, which may also be achieved by shaping the arm as a Y-shape or wishbone shape. A single linear arm may of course also be applied. Moreover, in some embodiments, the arm may be completely absent, and the seismic source suspends only from line 20 to allow it to be brought back in the protective space 8.

In the embodiment illustrated in FIG. 1, the pivotable arm 16 can be brought back up by means of the line 20 that can be retracted from the hull 3. In some embodiments, this line 20 may be a separate line that can be operated from the hull 3 to extend or retract. For example, in some embodiments the line 20 may be connected to a reel that can be actuated using an actuator operated by the controller such as to extend or retract the line 20. However, in the embodiment of FIG. 1, the line 20 is the hoist line 20 which is also used to lift the array 1 from the sea surface when it is recovered. Thereto, the hoist line 20 on it's other end connects into a hoist line connector 22, that can be connected to a lift line of any kind of crane or lifting structure on the survey ship or exploration carrier. By lifting the array 1, tension is applied to the hoist line 20 which thereby causes the pivotable arm 16 to pivot upward such as to bring the seismic source 12 in the first position located in the protective space 8 between the frame elements 6 and 7 of frame 5.

Figure 2:
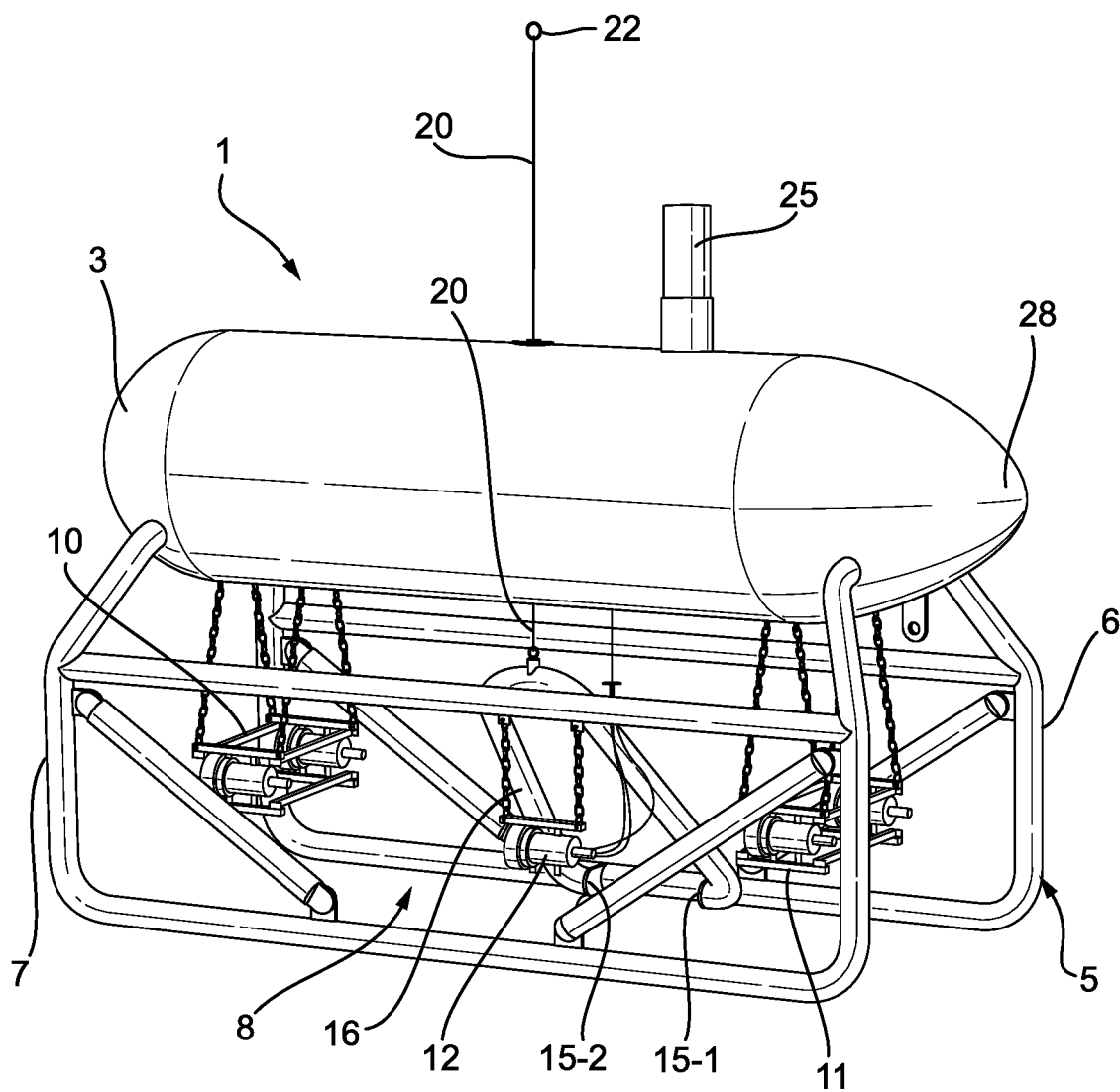
FIG. 2 illustrates the seismic source array of FIG. 1 with retracted pivotable arm.

In FIG. 2, the array 1 of FIG. 1 is illustrated in a further operational state wherein the hoist line 20 is pulled up, e.g. being connected to a lift line (not shown) of a lifting structure during recovery or launch. The pivotable arm 16 in this state holds the seismic source element 20 in the first position wherein it is located within the protected space 8. As can be seen clearly in FIG. 2, the frame elements 6 and 7 are shaped such as to allow placing the whole array onto a flat surface, e.g. the deck of a ship. Thereby, the suspending seismic source elements are located in the protected space and form no danger to the operators on board of the ship, nor do they hinder or complicate the launch and recovery process.

FIG. 3 is a schematic illustration of a array 1 in accordance with the present invention. The array 1 is towed via tow line 32 by a survey vessel (not shown). The tow line 32 may at the same time provide a wireline connection with the survey vessel, enabling high pressure air, data signals and instructions to be exchanged between the array 1 and the survey ship. Such data may alternatively be exchanged via a wireless connection or via a separate communication cable. The receiver elements 40-1 through 40-4 pick up the reflected acoustic signals and provide an electric output signal that is conveyed via the receiver line 35 to the array 1. In use, the air guns 10, 11 and 12 (i.e. serving as seismic source elements) generate synchronized acoustic pulses 45 46 and 47 that travel downwards towards the sea floor 50. The acoustic signals are reflected partly by the sea floor 50, as illustrated schematically by arrow 48. However, part of the acoustic signals penetrate the earth and are reflected by subterranean layers, such as layer 52. This is schematically illustrated by arrow 49.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . ." should be read as: "component configured for . . ." or "member constructed to . . ." and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A seismic source array comprising:
a housing;
a plurality of seismic sources, each seismic source being configured for generating a seismic signal;

a protective structure attached to the housing and comprising a frame defining a protective space near the housing, wherein the plurality of seismic sources are suspended from the housing in a first position relative to the housing and arranged within the protective space defined by the protective structure;

a suspension structure suspending at least one seismic source of the plurality of seismic sources and comprising a pivotable arm structure that is rotatable relative to the frame for moving the at least one seismic source to a second position relative to the housing, wherein the second position being located outside the protective space; and three seismic sources, wherein two of the seismic sources are suspended from the housing and configured to remain, while in use, in the first position relative to the housing, and wherein a third of the seismic sources is suspended from the housing by the suspension structure configured for moving the third seismic source to the second position relative to the housing, the third seismic source being connected to the protective structure by the pivotable arm, wherein a hoist line extends from the housing to enable operation of the pivotable arm during launch and recovery of the array.

2. The seismic source array according to claim 1, further comprising:

the hoist line extending through the housing, the hoist line being extendable and retractable for enabling the at least one seismic source to be moveable between the first position and the second position.

3. The seismic source array according to claim 2, wherein the hoist line connects to a reel arranged inside the housing.

4. The seismic source array according to claim 2, wherein a first section of the hoist line extends through a first part of the housing towards the at least one seismic source, and wherein the hoist line with a second section thereof extends through a second part of the housing opposite the first part, the hoist line comprising a coupling element on said second section thereof.

5. The seismic source array according to claim 1, further comprising one or more floatation members.

6. The seismic source array according to claim 5, wherein the floatation members comprise one or more integrated buoys arranged in the housing.

7. The seismic source array according to claim 1, wherein the housing further comprises at least one element of a group comprising: a positioning device, a gas manifold including gas channels coupled to the plurality of seismic sources, a wireless or wireline communication device, or a tow connector part.

8. The seismic source array according to claim 1, further comprising receiver line extending from the housing towards one or more acoustic receiver units.

9. The seismic source array according to claim 1, wherein the pivotable arm comprises at least two arms forming a V-shape, wherein the at least one seismic source is connected at an apex of the V-shape, and wherein the pivotable arm is connected by hingeable connections to the frame at two ends of the V-shape.

10. A survey ship configured for deploying a seismic source array, the seismic source array comprising:

a housing;

a plurality of seismic sources, each seismic source being configured for generating a seismic signal;

a protective structure attached to the housing and comprising a frame defining a protective space near the housing, wherein the plurality of seismic sources are suspended from the housing in a first position relative to the housing and arranged within the protective space defined by the protective structure;

a suspension structure suspending at least one seismic source of the plurality of seismic sources and comprising a pivotable arm structure that is rotatable relative to the frame for moving the at least one seismic source to a second position relative to the housing, wherein the second position being located outside the protective space; and three seismic sources, wherein two of the seismic sources are suspended from the housing and configured to remain, while in use, in the first position relative to the housing, and wherein a third of the seismic sources is suspended from the housing by the suspension structure configured for moving the third seismic source to the second position relative to the housing, the third seismic source being connected to the protective structure by the pivotable arm, wherein a hoist line extends from the housing to enable operation of the pivotable arm during launch and recovery of the array.

11. The seismic source array according to claim 1, wherein the pivotable arm has a wishbone shape.

12. The seismic source array according to claim 1, wherein the pivotable arm has a Y-shape shape.

* * * * *